United States Patent [19]
Tzen

[11] Patent Number: 5,787,548
[45] Date of Patent: Aug. 4, 1998

[54] DOOR DAMPER

[76] Inventor: Chou-Shiang Tzen, No. 8, Lane 23, San Min 2nd St., Ta Li City, Taichung Hsien, Taiwan

[21] Appl. No.: 866,610

[22] Filed: May 30, 1997

[30] Foreign Application Priority Data

Aug. 29, 1996 [TW] Taiwan ................... 85213251

[51] Int. Cl.⁶ .................................................. E05F 5/02
[52] U.S. Cl. ........................ 16/82; 292/DIG. 15; 292/338
[58] Field of Search ............................. 16/82, DIG. 10, 16/DIG. 17, 86 R, 86 A; 292/DIG. 15, 338, 339, 340, 341.15, 341.18, 341.19

[56] References Cited

U.S. PATENT DOCUMENTS

| 4,163,574 | 8/1979 | Chezem | 292/338 |
| 4,215,885 | 8/1980 | McCray | 292/338 |
| 4,676,536 | 6/1987 | Arbic et al. | 292/DIG. 15 |
| 4,759,577 | 7/1988 | Thomas et al. | 292/338 |
| 5,590,928 | 1/1997 | Voiculescu | 292/DIG. 15 |
| 5,601,319 | 2/1997 | Morin | 292/339 |
| 5,618,072 | 4/1997 | Pitchford | 292/DIG. 15 |

*Primary Examiner*—Chuck Mah
*Attorney, Agent, or Firm*—Heller Ehrman White & McAuliffe

[57] ABSTRACT

A door damper includes a base, an outer tube having one end rotatably received in the base, an inner tube retractably received in the outer tube, a contacting member disposed to the inner tube so as to contact an inner side of a door, an actuating member including a handle and an end plate which extend transversely from an end of the handle wherein the end plate inserted into and pivotally connected to the inner tube via a slot defined in the inner tube, and an actuating member eccentrically disposed to a free end of the end plate and rotatably received in an underside of the contacting member.

8 Claims, 8 Drawing Sheets

5,787,548

DOOR DAMPER

BACKGROUND OF THE INVENTION

1. Field of the Invention

The present invention relates to a door damper which is inclinedly disposed between the ground and an inner side of the door so as to prevent the door from being forcibly opened.

2. Brief Description of the Prior Art

FIG. 1 shows a conventional chain lock for a door 70 wherein the chain lock comprises a chain 90, a slide head 91 fixedly connected to a first end of the chain 90 and a receiver 80 fixedly disposed to an inner side of the door 70, wherein a second end of the chain 90 is fixedly connected to a jamb 71. The receiver 80 has a slot 81 defined in an outer periphery thereof and the periphery defining the slot 81 has an enlarged end 82, the slide head 91 is sized to be inserted into the slot 81 via the enlarged end 82 only. Therefore, when the slide head 91 is received in the slot 81, the door 70 can only be opened slightly thereby defining a gap between the jamb 71 and the door 70, and a pair of scissors or another cutting tool (not shown) could be inserted into the gap to cut the chain 90.

The present invention intends to provide a door damper to mitigate and/or obviate the above-mentioned problems.

SUMMARY OF THE INVENTION

The present invention provides a door damper and comprises a base having a first ball member rotatably received therein which has a neck extending radially therefrom to connect to a first end of an outer tube which has a plurality of first holes defined therethrough. At least one inner tube is retractably received in the outer tube and has two second holes defined diametrically opposite therethrough near a first end thereof. A first slot is defined in a periphery thereof near a second end thereof and two third holes are defined diametrically opposite therethrough wherein the first slot is located between the two third holes along a peripheral surface of the inner tube.

A spring member is urgedly received in the inner tube and has two studs extending therefrom so as to extend through the second holes and the first holes for positioning the inner tube. A handle has an end plate extending transversely from one of two ends thereof, the end plate having a fourth hole defined therethrough and an actuating member pivotally connected to a position above the fourth hole. The end plate is inserted into the first slot and a pin extends through the third holes and the fourth hole. A contacting member has a first end received in the second end of the inner tube above the actuating member and a second end for securely contacting an inner side of a door. The actuating member is pivotally connected to the first end of the contacting member.

It is an object of the present invention to provide a door damper which can be quickly engaged.

It is another object of the present invention to provide a door damper having a simple structure.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
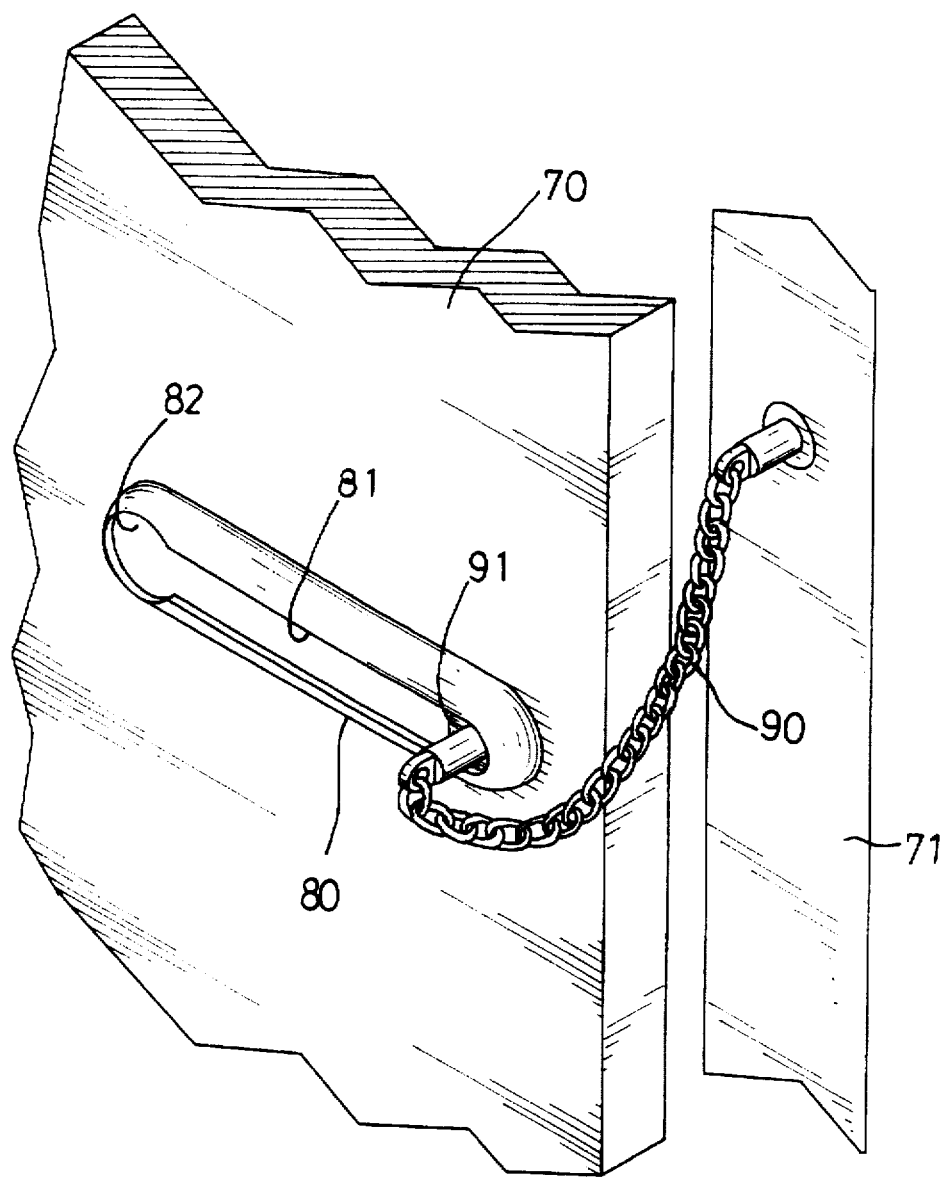
FIG. 1 is a perspective view of a conventional chain lock disposed between a jamb and a door.
Figure 2:
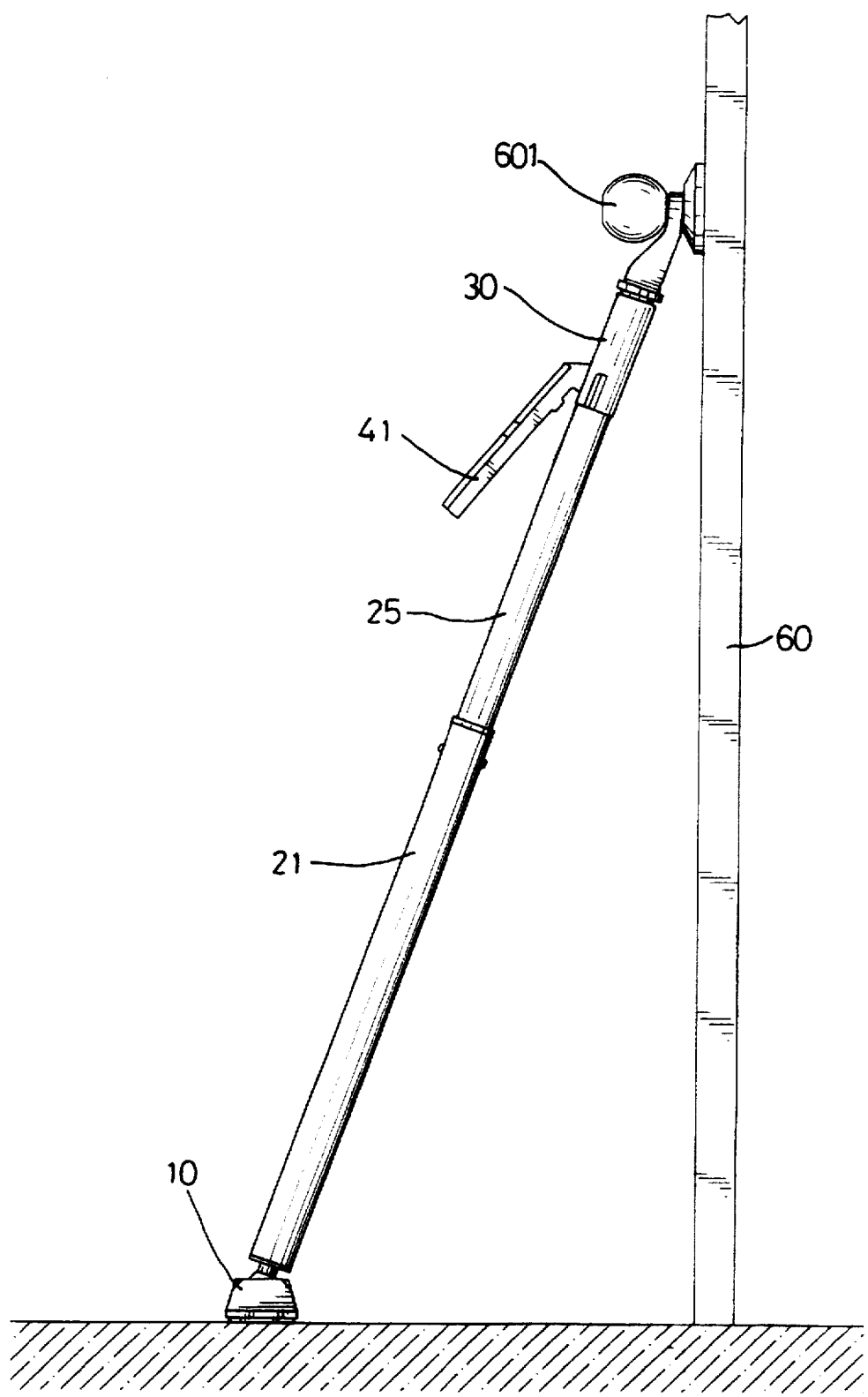
FIG. 2 is a side elevational view to show a door damper in accordance with the present invention in engaged status.
Figure 3:
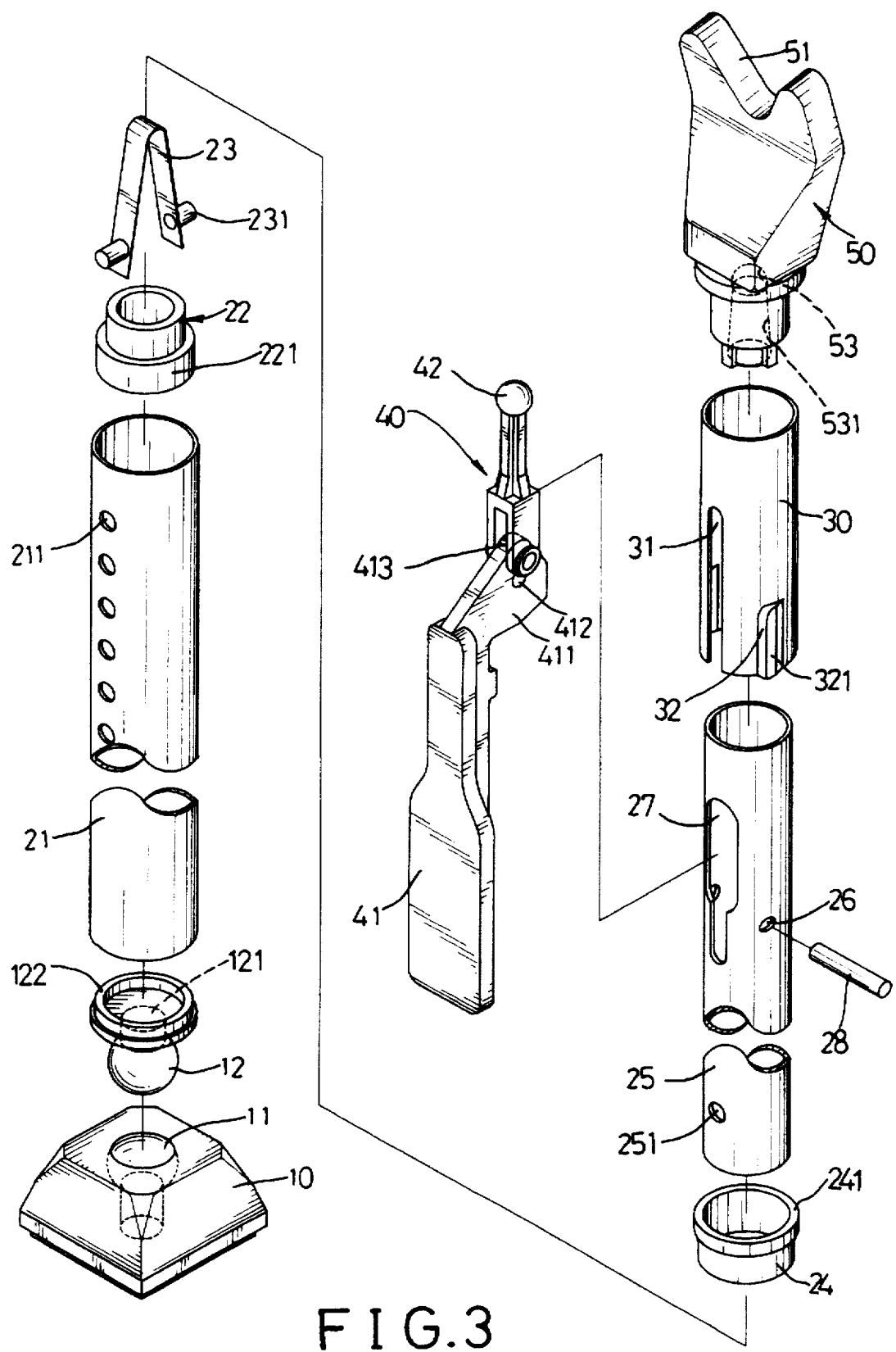
FIG. 3 is an exploded view of the door damper in accordance with the present invention.
Figure 4:
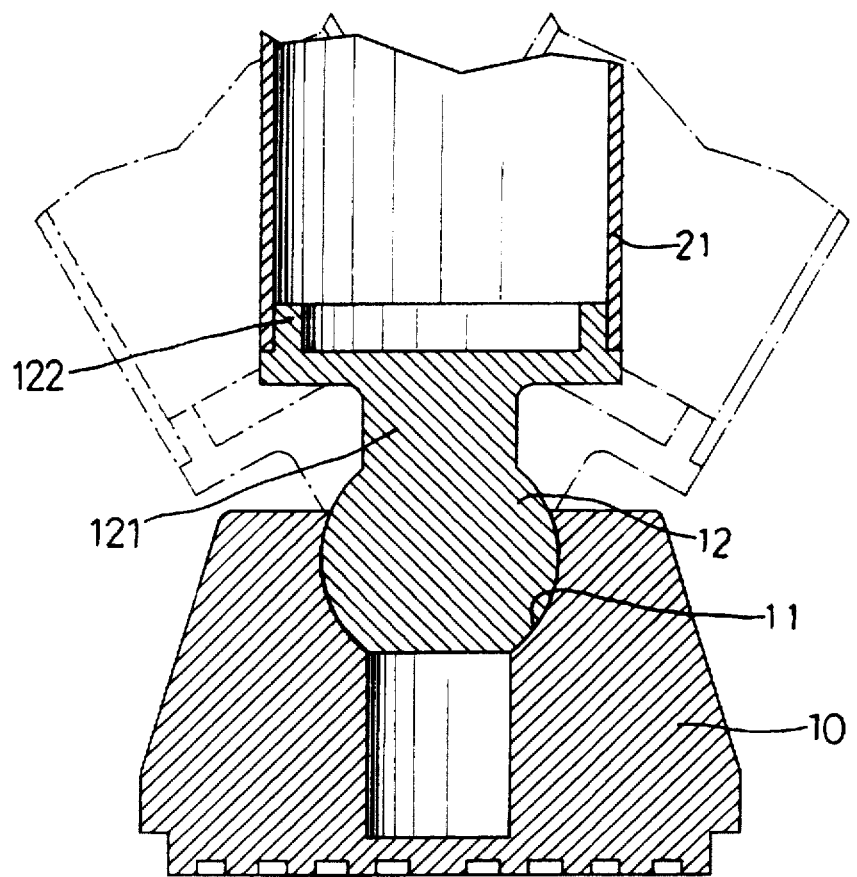
FIG. 4 is a side elevational view, partly in section, of a ball member rotatably received in a base and connected to an outer tube.
Figure 5:
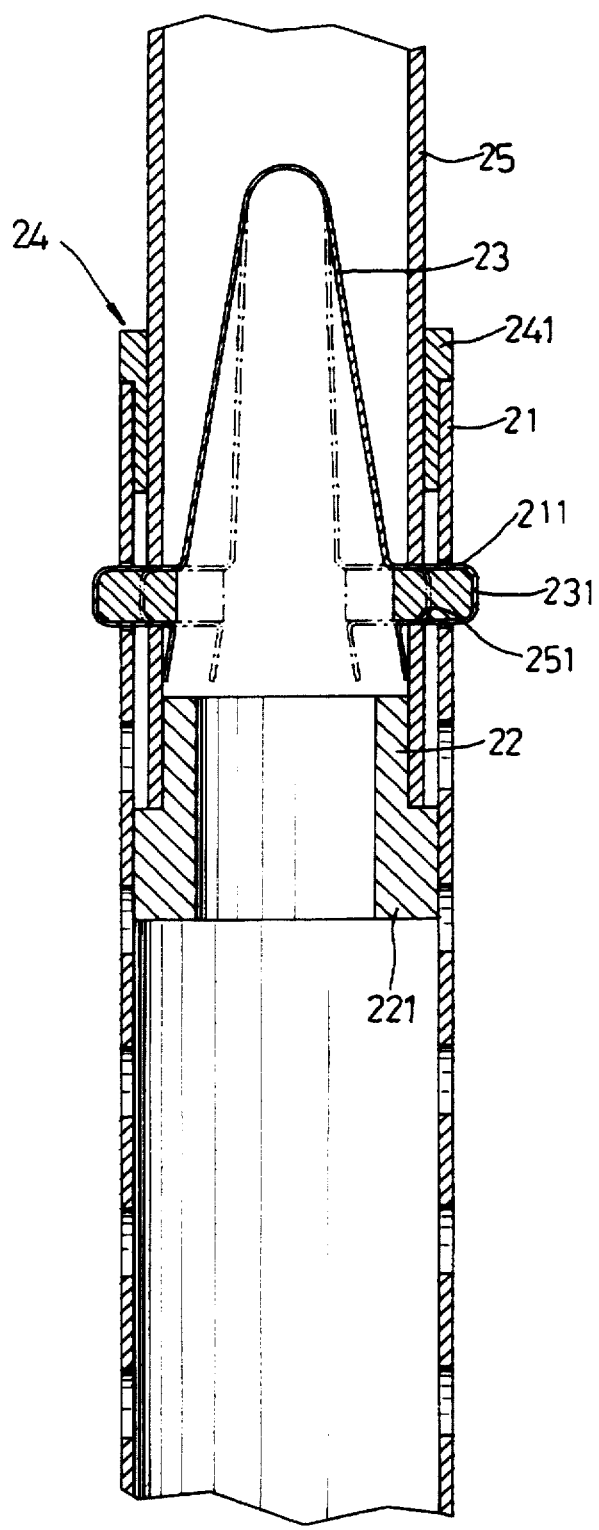
FIG. 5 is a side elevational view, partly in section, of an inner tube positioned in the outer tube by a spring member received in the inner tube wherein the spring member has two studs extending through holes respectively defined through the inner tube and the outer tube.

Referring to the drawings and initially to FIGS. 2 through 4, a door damper in accordance with the present invention generally includes a base 10 defining recess 11 in a top thereof so as to rotatably receive a first ball member 12 therein which has a neck 121 extending radially therefrom and an insert portion 122 formed thereto so as to be fixedly connected to an outer tube 21. The base 10 has a frictional underside so that it does not slide on a floor. The outer tube 21 has a first end connected to the insert portion 122 of the neck 121 and a plurality of first holes 211 defined therethrough. The outer tube 21 has a first collar member 24 disposed to the second end thereof wherein the first collar member 24 has a first flange 241 extending radially from an upper edge thereof so as to engage with the second end of the outer tube 21 (FIG. 5).

At least one inner tube 25 is retractably received in the outer tube 21 and has two second holes 251 defined diametrically opposite therethrough near a first end thereof which has a second collar member 22 disposed thereto, wherein the second collar member 22 has a flange 221 extending radially from a lower edge thereof so as to slidably move with the inner tube 25 in the outer tube 21. A first slot 27 is defined in a periphery of the inner tube 25 near a second end thereof and two third holes 26 are defined diametrically opposite therethrough wherein the first slot 27 is located between the two third holes 26 along a peripheral surface of the inner tube 25.

A spring member 23 is an inverted V-shaped member and urgedly received in the inner tube 25. The spring member 23 has two studs 231 respectively extending from two distal ends thereof so as to extend through the second holes 251 and the first holes 211 to position the inner tube 25 when the inner tube 25 is adjusted to a desired position. The spring member 23 and the inner tube 25 are prevented from being withdrawn from the outer tube 21 by the first collar member 24.

A handle 41 has an end plate 411 extending transversely from one of two ends thereof, the end plate 411 having a fourth hole 412 defined therethrough and a cam portion 413 protruding from a periphery thereof and the cam portion 413 located above the fourth hole. An actuating member 40 is pivotally connected to the cam portion 413. The actuating member 40 has a second ball member 42 formed on a free end thereof. The end plate 411 is inserted into the first slot 27 and a pin 28 extends through the third holes 26 and the fourth hole 412 so that the handle 41 can be pushed downwardly about an axis of the pin 28 extending to lift the actuating member 40 upwardly.

Figure 6:
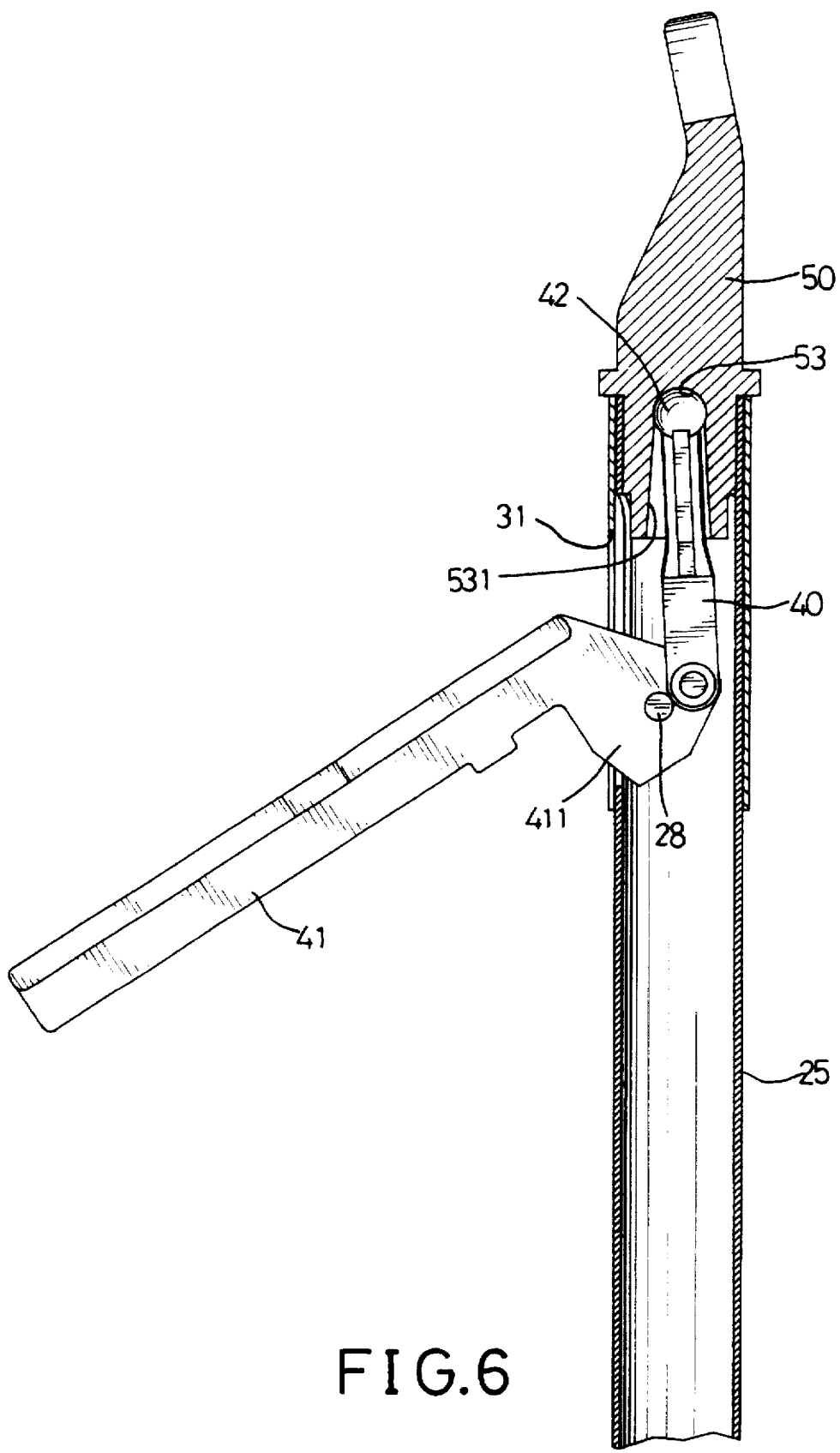
FIG. 6 is a side elevational view, partly in section, of an actuating member disposed to the inner tube, wherein a contacting member connected to the inner tube is not lifted by the actuating member.

A contacting member 50 has a first end received in the second end of the inner tube 25 above the actuating member 40 and a second end for securely contacting an inner side of a door 60 (FIG. 2). The first end of the contacting member 50 has a recess 531 defined therein which has a sphere bottom 53 so as to receive the second ball member 42 therein as shown in FIG. 6 and the second end of the contacting member 50 has a fork portion 51 formed thereon so as to engage with a lock 601 extending from the door 60. A sleeve 30 is mounted to a second end of the inner tube 25 and defines a second slot 31 extending from a lower end thereof so as to receive the end plate 411 therein. The sleeve 30 defines two cutaways 32 diametrically opposite therein and each of the cutaways 32 is further defined by an ear 321 extending laterally from the sleeve 30 so that two ends of the pin 28 are respectively received in the two cutaways 32 and the two ears 32 prevent the pin 28 from being disengaged from the third holes 26.

Figure 7:
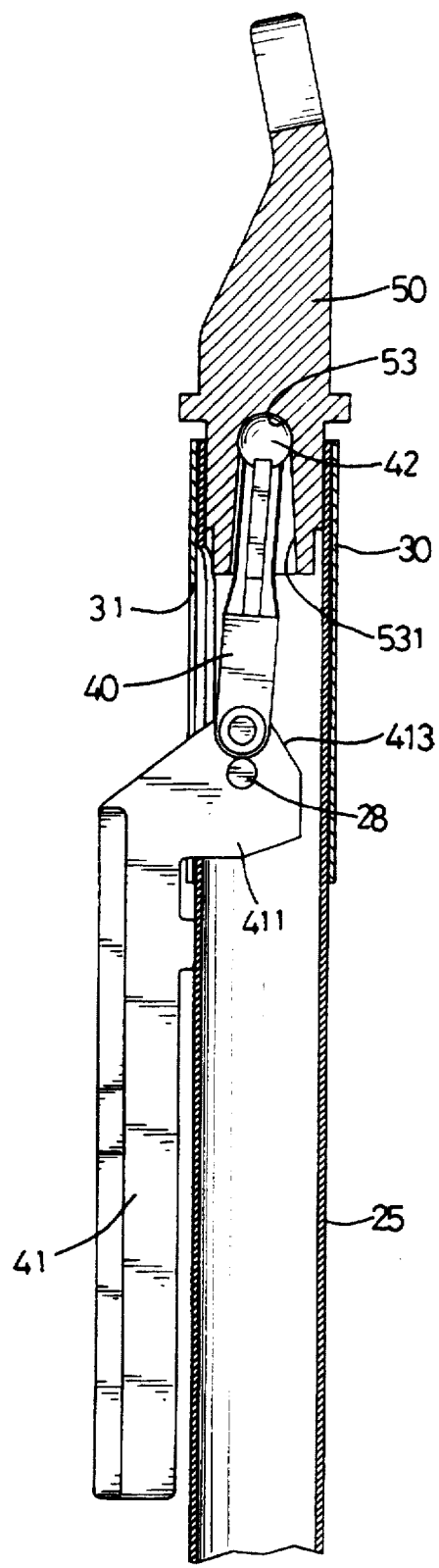
FIG. 7 is a side elevational view, partly in section, of the contacting member which is lifted by pushing a handle of the actuating member downwardly.

Referring to FIGS. 2 and 7, the inner tube 25 is adjusted by pushing the two studs 231 from the first holes 211 into the outer tube 21 and pulling the tube to a desired position where the two studs 231 enter into another two first holes 211 to position the inner tube 25. The lock 601 is received in the fork portion 51 so that the door damper inclinedly stands between the floor and the lock 601. The handle 41 is then pushed downwardly about the axis of the pin 28 to lift the actuating member 40 upwardly so that the contacting member 50 exerts a force on the lock 601. Therefore, the door 60 cannot be easily opened except by overcoming a frictional force between the underside of the base 10 and the floor. The force exerted on the lock 601 can be easily released by lifting the handle 41.

Figure 8:
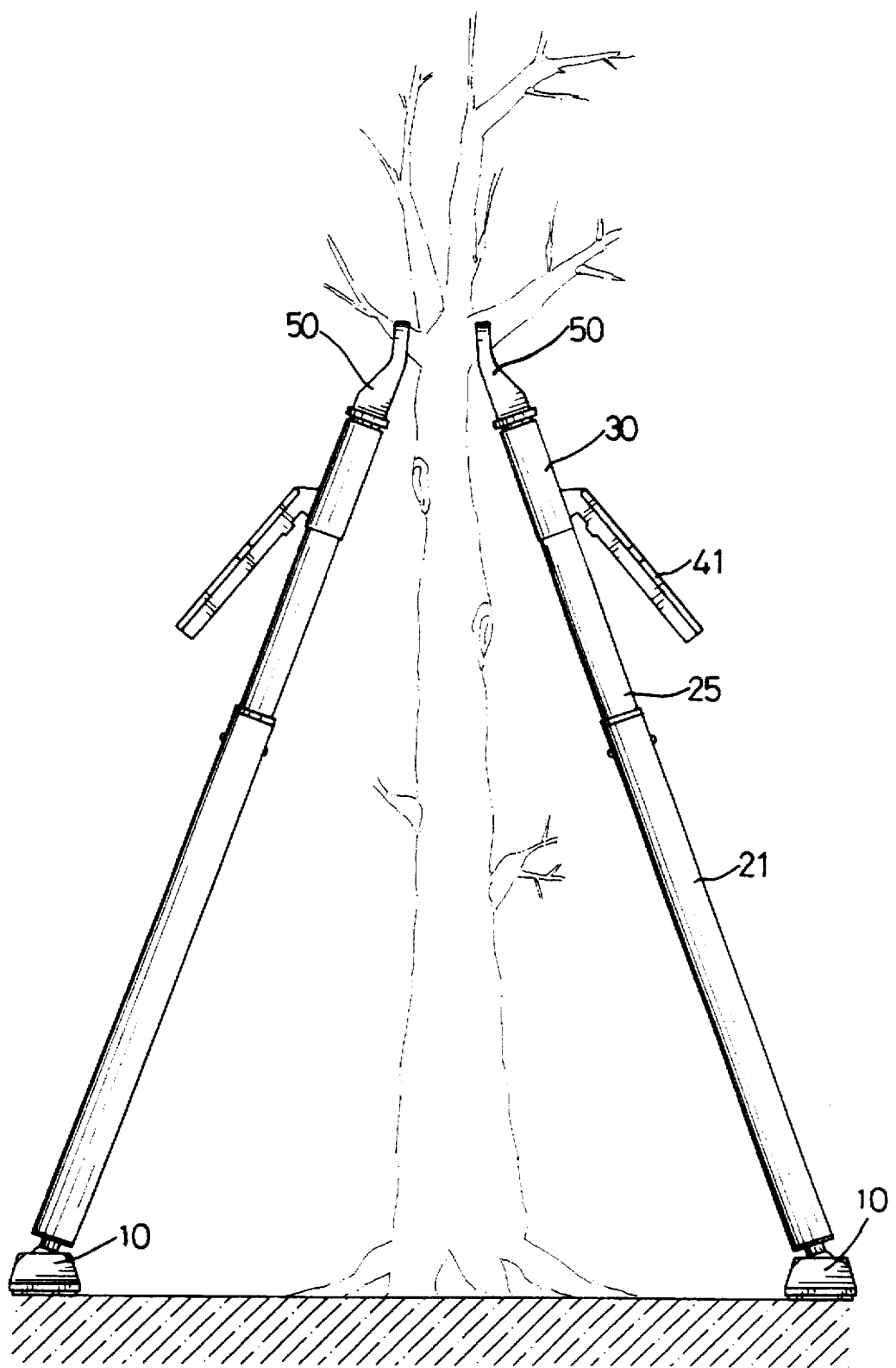
FIG. 8 shows an alternate way to use two door dampers of the invention to support a tree (shown in phantom lines).

FIG. 8 shows an alternate way to use two door dampers of the present invention to support a tree which is shown in phantom lines.

Although the invention has been explained in relation to its preferred embodiment, it is to be understood that many other possible modifications and variations can be made without departing from the spirit and scope of the invention as hereinafter claimed.

What is claimed is:

1. A door damper comprising:

a base having a first ball member rotatably received therein, said first ball member having a neck extending radially therefrom;

an outer tube having a first end connected to said neck and a plurality of first holes defined therethrough;

at least one inner tube retractably received in said outer tube and having two second holes defined diametrically opposite therethrough near a first end thereof, a first slot defined in a periphery thereof near a second end thereof and two third holes defined diametrically opposite therethrough wherein said first slot is located between said two third holes along a peripheral surface of said inner tube;

a spring member urgedly received in said inner tube and having two studs extending therefrom so as to extend through said second holes and said first holes to position said inner tube;

a handle having an end plate extending transversely from one of two ends thereof, said end plate having a fourth hole defined therethrough and an actuating member pivotally connected to a position above said fourth hole, said end plate inserted into said first slot and a pin extending through said third holes and said fourth hole, and a contacting member having a first end received in said second end of said inner tube above said actuating member and a second end for securely contacting an inner side of a door, a free end of said actuating member pivotally connected to said first end of said contacting member.

2. The door damper as claimed in claim 1 wherein said first end of said contacting member has a recess defined therein which has a sphere bottom and said free end of said actuating member has a second ball member formed thereto so as to be rotatably received in said sphere bottom of said recess.

3. The door damper as claimed in claim 1 wherein said contacting member has a fork portion formed to said second end thereof.

4. The door damper as claimed in claim 1 wherein said outer tube has a first collar member disposed to said second end thereof wherein said first collar member has a first flange extending radially from an upper edge thereof so as to engage with said second end of said outer tube to prevent said spring member and said inner tube from being withdrawn from said outer tube.

5. The door damper as claimed in claim 1 wherein said inner tube has a second collar member disposed to a first end thereof wherein said second collar member has a flange extending radially from a lower edge thereof so as to slidably move with said inner tube in said outer tube.

6. The door damper as claimed in claim 1 wherein a sleeve is mounted to a second end of said inner tube and has a second slot extending from a lower end thereof so as to receive said end plate therein.

7. The door damper as claimed in claim 6 wherein said sleeve has two cutaways defined diametrically opposite therein and each of said cutaways is further defined by an ear extending laterally from said sleeve.

8. The door damper as claimed in claim 1 wherein said end plate has a cam portion protruding from a periphery thereto and located above said fourth hole, said actuating member pivotally connected to said cam portion.

* * * * *